June 29, 1943.   F. P. SCULLY ET AL   2,323,156
LIQUID LEVEL INDICATOR
Filed Jan. 15, 1941
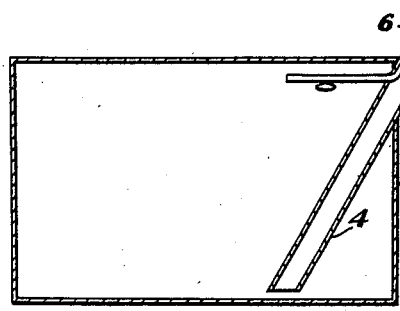
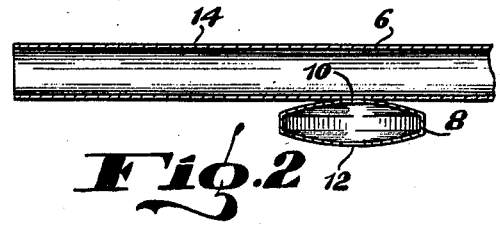
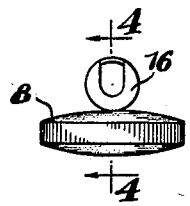
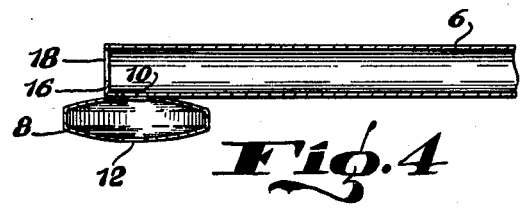
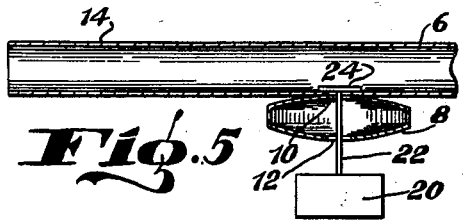
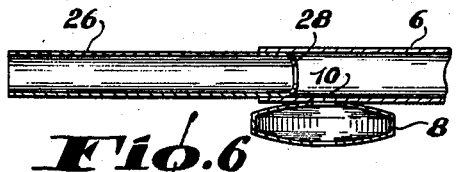
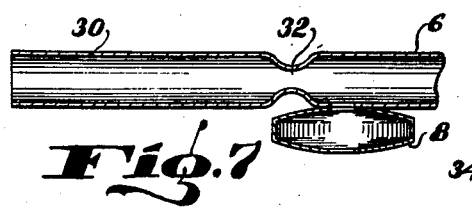
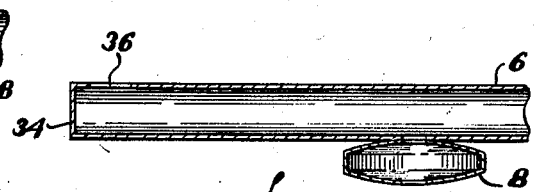
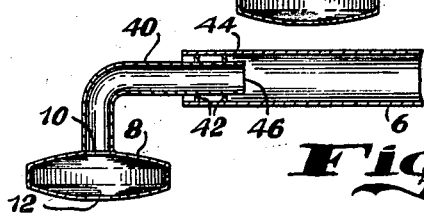
Inventors
Frank P. Scully &
Alcide E. Mathey
By Yardley Chittick
Attorney Patented June 29, 1943

2,323,156

UNITED STATES PATENT OFFICE 2,323,156

LIQUID LEVEL INDICATOR

Frank P. Scully, Cambridge, and Alcide E. Mathey, Boston, Mass., assignors to Scully Signal Company, East Cambridge, Mass., a corporation of Massachusetts Application January 15, 1941, Serial No. 374,510

9 Claims. (Cl. 116—109)

This invention relates to signaling means for use with tanks.

One object of the invention is the provision of a positive, low-priced, simple construction which will positively and accurately indicate when the rising liquid level in a tank being filled has reached a predetermined point.

In filling certain types of tanks, as, for example, gasoline tanks in automobiles, it is desirable that the indicator permit almost complete filling of the tank before the signal is given, so that as much fuel as possible may be provided on each filling occasion.

It is further essential, in connection with mass production principles that prevail in the automobile industry, that the cost of such indicator be maintained at a minimum in order that the inclusion of the device on even the lowest price automobiles, to the benefit of the general public, may be possible.

In the typical tank with which the present invention would be used, filling means is customarily provided which effectively prevents the escape of the displaced gas through the fill pipe. That is, the fill pipe is either the so-called deep fill, in which the discharge end of the fill pipe is close to the tank bottom, or else the fill pipe will have a bend or elbow in its length sufficient to insure complete filling of the pipe at this point by entering liquid. With such an arrangement, the displaced gases will be carried to the atmosphere by a suitably sized vent pipe, which will have connected therewith the signaling means. The invention in the present instance relates both to the particular vent pipe construction and the signaling means and the relation therebetween.

One of the difficulties encountered in signaling means of the whistling type is the tendency toward what is called "spitting." That is, when the liquid level reaches the point at which it cuts off the signal, usually by sealing a tube connected with a whistle or the whistle itself, the tank pressure will force a quantity of liquid into the vent pipe, from which it will be blown to the atmosphere by the gases that are still escaping through the higher unclosed by-passing port. It is therefore contemplated that the present construction will avoid the spitting tendency as much as possible.

These and other objects of the invention will become more apparent as the description proceeds with the aid of the accompanying drawing, in which Fig. 1 is a diagrammatic sectional elevation of a tank with a fill pipe and vent.

Fig. 2 is a detailed sectional elevation of one form of the invention.

Fig. 3 is an end elevation of a modified form of the invention.

Fig. 4 is a sectional elevation on the line 4—4 of Fig. 3.

Fig. 5 is still another modification in which the whistle is silent during filling.

Figs. 6, 7, 8, and 9 are still other modifications.

Fig. 10 is a further modification in which the passageway connecting with the whistle is brought into the principal vent pipe through the open end.

In the construction of a signaling unit of the type herein shown, it is essential that the vent pipe be of sufficient size to carry off easily the gas displaced under conditions of normal filling. At the present time, normal filling may be considered as of the order of 15 gallons per minute. The vent pipe necessary to handle this volume of gas at safe pressures is considerably larger in cross-sectional area than the size of apertures necessary through a whistle capable of producing a suitable sound.

If a vent pipe of suitable size and a whistle of relatively small gas passage area are joined together, both leading to the common vent that goes to the atmosphere, the amount of gas normally passing through the two would be in proportion to their areas. By the construction disclosed herein, it has been made possible to tap into a vent pipe of substantial size an auxiliary aperture to which is connected a whistle of small capacity, but at the same time insure the passage of sufficient gases through the whistle to produce a satisfactory signaling sound. The invention resides primarily in the relationship of the various parts which are responsible for the achieved result. It is appreciated that it is old to provide a vent pipe that has a passage leading thereto directly from the interior of the tank and also having connected thereto a whistle of the general type herein disclosed, but it is believed new to arrange the vent pipe in relation to the whistle in such manner that there may be permanently available a vent pipe large enough to handle the quantity of gas normally being displaced and at the same time cause some of the escaping gas to pass through the whistle in such manner as to produce satisfactory audibility.

The particular relationships above referred to will be brought out more fully hereinafter.

Referring to the drawing, in Fig. 1 there is represented a tank 2 which has a deep fill connection 4 and a vent pipe 6. As previously pointed out, any other type of fill connection that prevents discharge of displaced gas therethrough may be used.

The construction of the tank end of vent pipe 6 and the related whistle constitutes the present invention. Details of such constructions are shown in Figs. 2 to 9.

In all of the species shown in Figs. 2 to 10, the whistle is referred to as 8, being of the usual button construction, with aligned apertures 10 and 12 therethrough. In Figs. 2 to 8, the whistle is connected directly to the vent pipe, while in Fig. 9 it is shown as extending a short distance therebelow and connected by means of a short tube 11. The object of this modification is to lower the point at which the signal changes before subsequent overflow takes place through vent pipe 6. The construction of Fig. 10 differs from the other forms in that the exit passage from the whistle extends into the principal vent pipe, not through the side, but through the open end.

In all of the forms, the construction is intended to provide means for maintaining a sufficiently low pressure on the vent side of the whistle to insure a satisfactory signal. The construction of that part of the principal vent pipe from the point where the whistle passage empties into the vent pipe to the end of the vent pipe is for the purpose of causing the large volume of gas passing therethrough to travel by the exit end of the whistle passage in such manner as to reduce the pressure at that point sufficiently to produce a suitable whistle tone. The construction disclosed results in a velocity head past the whistle passage in a direction capable of inducing the desired low pressure.

In all cases, the venting capacity of the main venting passage, after the whistle passage has been closed by rising liquid level, will be adequate to vent gas rapidly enough to prevent the development of excessive tank pressures.

In Fig. 1 the whistle 8 is attached to the vent pipe 6 at a substantial distance from the end. The extension 14 of the vent pipe is long enough to insure smooth flow of gas passing therethrough before reaching the whistle opening 10. The velocity of the gas passing by opening 10 affects the pressure at that point and assists in controlling the flow of gas through the whistle. Enough gas passes through the whistle to give a plain signal. The construction in Figs. 3 and 4 is designed to serve the same purpose. It differs, however, in that the whistle 8 is attached to the vent pipe close to the end, but the pressure control at opening 10 is accomplished by the partial closing of the lower half of the vent pipe, as at 16. The effect of this construction is to cause gas entering vent pipe 6 at the opening 18 to induce a lower pressure at whistle opening 10, thereby improving the flow of gas through the whistle to give a better sound.

The construction in Fig. 5 is the same as that in Fig. 2 as far as the location of the whistle with respect to the extended vent pipe end 14 is concerned. However, it has been desirable in some instances to have the whistle silent during filling, with means for causing the whistle to produce a sound when the liquid level has risen to the predetermined point. This result is achieved through the use of a float 20 suspended by a rod or wire 22, which in turn is connected to a valve member 24, closing opening 10 of the whistle.

From this construction, it can be seen that during filling the gas will pass solely through vent pipe 6 until the liquid level raises float 20 to open the passage through the whistle. As soon as this is done, the whistle commences to sound, continuing until such time as the upper side of float 20 comes into engagement with the whistle to close the lower opening 12. Thereupon the whistle becomes silent, indicating to the operator that filling should be discontinued. The length of wire 22 is such that valve 24 will not come into engagement with the upper side of the vent pipe before float 20 has closed opening 12. A further advantage of this construction is that, through the actual closing of the whistle by float 20, any tendency toward spitting is eliminated.

The construction of Fig. 6 is in effect a combination of the constructions of Figs. 2 and 4. For manufacturing reasons, it may be desirable in certain instances to make the vent pipe in two pieces. This may be accomplished by inserting a suitable length of pipe 26 within the end of vent pipe 6, as shown. In order to control the pressure at whistle opening 10 to improve the whistle sound, it has been found desirable to roll the end of extension 26 inwardly, as at 28, thereby directing the principal venting gases into vent pipe 6 at a point above opening 10. The velocity head of the gases acts to assist in drawing additional gas through the whistle, thereby improving the tone characteristics.

In Fig. 7 is shown a construction that operates on the same principle as that of Fig. 6, the difference being that the extension 30 is integral with vent pipe 6, the restriction at 32 being formed by reducing the vent pipe diameter at that point.

The construction disclosed in Fig. 8 differs from that of Fig. 2 in that the extension end of the vent pipe is closed at the end at 34, the opening being located instead at 36 at the top of the pipe. The purpose of this form is to raise the entrance to the vent pipe to a higher level to minimize the chance of liquid slopping into the vent pipe from the disturbed surface prior to discontinuance of the supply.

Another construction which accomplishes both improved whistling conditions and at the same time affords a greater time period between the cut-off of the whistle and the arrival of the liquid level at the vent pipe is shown in Fig. 9. In this form the whistle, instead of being connected directly to the vent pipe, as in Fig. 2, is located any desired distance below, being connected to the vent pipe 6 by tube 11. The passage of gas through extension 38 into vent pipe 6 acts in the same manner as in the previous examples, in that it straightens out the flow of the gas to cause a suitable pressure within tube 11, thereby facilitating the flow through the whistle to improve the sound.

The construction of Fig. 10 provides a tube 40 leading from the whistle into the main vent pipe 6. This tube, it will be seen from the drawing, enters vent pipe 6 through the end rather than through the side, as in Fig. 9. Tube 40 may be supported in position by any convenient means, such as the members 42, which, while strong enough to carry the weight of the whistle, are not sufficiently large to impede the flow of gas through the principal passageway.

During venting most of the gas passes through the annular area 44 surrounding vent pipe 40, joining with such gas as comes through pipe 40 in the common vent pipe 6. It is apparent that the velocity head of the gas in passage 44, as it flows beyond the end of pipe 40, causes a reduction in pressure at the exit end 46 of the whistle passage, which in turn facilitates the flow of gas through the whistle to improve the sound.

In every instance it will be observed that the construction is designed to utilize the velocity head of the gas as it flows past the exit side of the whistle passage to create a reduced pressure at that point adequate to draw gas through the relatively small area of the whistle in proper volume to produce a suitable signal. In all forms, however, it is intended that the area provided through the vent pipe is sufficient to permit venting at a rate fast enough to prevent any rise of pressure within the tank greater than the safe limit for the particular tank construction.

We claim:

1. The combination of a tank and liquid level indicating means, said indicating means comprising a vent pipe leading from the tank interior to the outside and of sufficient capacity to vent said tank during normal filling without causing an increase in the internal tank pressure above safe limits, an opening in the side of said pipe, a whistle located exterior of said pipe and in series with said opening, that portion of said vent pipe from said opening to the inner end thereof being formed in such manner that the flow of gas therethrough will induce a pressure at said opening lower than that which would otherwise normally prevail to increase the flow of gas through said whistle during filling of said tank, the entrance to said whistle passage being lower than the entrance to said vent pipe.

2. In combination, a tank having a fill pipe and combined venting and liquid level indicating means, said liquid level indicating means comprising a tube extending from the interior of the tank to the exterior, the inner end portion of said tube extending substantially horizontally and positioned a short distance above the level at which it is desired to give said indication, an opening through the side of said tube, a whistle connected to said opening and having its lowermost entrance at a level sufficiently below the entrance to said tube to permit time for manual shutting off of the flow of liquid to said tank before the liquid level has risen enough to flow into the end of said tube, the relation between the venting capacity of said tube and the capacity of the passage through the whistle being such that during normal filling sufficient gas will flow through said whistle to produce a signal while the liquid level is below said whistle entrance, the capacity of said tube alone being sufficient to permit venting during normal filling without causing the development of a pressure in said tank sufficient to cause overflow of said fill pipe.

3. In combination, a tank having a fill pipe and combined venting and liquid level indicating means, said liquid level indicating means comprising an open tube extending from the interior of the tank to the exterior, the inner end portion of said tube extending substantially horizontally close to the top of said tank, an opening through the side of the horizontal portion of said tube, a whistle connected directly to said opening exteriorly of said tube and having its lowermost entrance at a level sufficiently below the entrance to said tube to permit time for manual shutting off of the flow of liquid to said tank after said whistle entrance has been sealed by rising liquid and before the liquid level has risen enough to flow into the end of said tube, the relation between the venting capacity of said tube and the capacity of the passage through the whistle being such that during normal filling sufficient gas will flow through said whistle to produce a signal while the liquid level is below said whistle entrance, the capacity of said tube alone being sufficient to permit venting during normal filling without causing the development of a pressure in said tank sufficient to cause overflow of said fill pipe.

4. In combination, a tank having a fill pipe and combined venting and liquid level indicating means, said liquid level indicating means comprising an open tube extending from the interior of the tank to the exterior, the inner end portion of said tube extending substantially horizontally close to the top of said tank, an opening through the under side of the horizontal portion of said tube, a whistle positioned exteriorly of said tube and having its passage connected at right angles to said tube, the lowermost entrance to said whistle passage being at a level sufficiently below the entrance to said tube to permit time for manual shutting off of the flow of liquid to said tank after said whistle entrance has been sealed by rising liquid and before the liquid level has risen enough to flow into the end of said tube, the relation between the venting capacity of said tube and the capacity of the passage through the whistle being such that during normal filling sufficient gas will flow through said whistle to produce a signal while the liquid level is below said whistle entrance, the capacity of said tube alone being sufficient to permit venting during normal filling without causing the development of a pressure in said tank sufficient to cause overflow of said fill pipe.

5. In combination, a tank having a fill pipe and combined venting and liquid level indicating means, said liquid level indicating means comprising a tube extending from the interior of the tank to the exterior, the inner end opening of said tube positioned a short distance above the level at which it is desired to give said indication, an opening through the side of said tube, a whistle connected to said opening and having its lowermost entrance at a level sufficiently below the entrance to said tube to permit time for manual shutting off of the flow of liquid to said tank before the liquid level has risen enough to flow into the said inner end opening, the relation between the venting capacity of said tube and the capacity of the passage through the whistle being such that during normal filling sufficient gas will flow through said whistle to produce a signal while the liquid level is below said whistle entrance, the capacity of said tube alone being sufficient to permit venting during normal filling without causing the development of a pressure in said tank sufficient to cause overflow of said fill pipe.

6. A liquid level indicating device for use with a tank, comprising a tube open at both ends and long enough to extend from the exterior of the tank to an interior position slightly above the level at which the indication is to be given, on opening intermediate the ends of said tube, a whistle affixed to the exterior of said tube, with the whistle passage connecting with said opening, the entrance to said whistle passage being sufficiently distant from the inner end entrance to said tube so that the whistle entrance may be disposed far enough below the said tube entrance to provide time to shut off the liquid supply to the tank with which the device is used after the whistle entrance has been sealed by rising liquid and before the said tube entrance has been reached, the relation of the venting capacity of the tube to the capacity of the whistle passage being such that during normal filling of a tank with which it may be used sufficient gas will flow through said whistle passage to produce an audible signal, said tube being large enough to permit venting without the development of excessive pressure during normal filling.

7. A liquid level indicating device for use with a tank, comprising a tube open at both ends and long enough to extend from the exterior of the tank to an interior position slightly above the level at which the indication is to be given, an opening intermediate the ends of said tube, said tube being substantially straight from said opening to the interior end, a whistle affixed directly to the exterior lower side of said tube as when said tube is in operative position with the whistle passage connecting with said opening at right angles with said tube, the entrance to said whistle passage being sufficiently distant from the axis of the straight end portion of said tube so that the whistle entrance, when the straight end portion is horizontal, may be disposed far enough below the entrance to the interior end of said tube to provide time to shut off the liquid supply to the tank with which the device is used after the whistle entrance has been sealed by rising liquid and before the interior end entrance has been reached, the relation of the venting capacity of the tube to the capacity of the whistle passage being such that during normal filling of a tank with which it may be used sufficient gas will flow through said whistle passage to produce an audible signal, said tube being large enough to permit venting without the development of excessive pressure during normal filling.

8. Liquid level indicating means for use with tanks, comprising a tube forming a common vent through which gas may be vented, a first and a second passage merging in said common vent, the first of said passages formed by extension of said tube, the second of said passages commencing at a point lower than the entrance to said first passage and including a whistle and terminating at the point of beginning of said common vent, the first of said passages directing the flow of gas therethrough past the end of the whistle passage, said extension that forms the first of said passages having a restriction therein whereby the velocity of gas passing therethrough past the end of said whistle passage will be accelerated and the pressure at the exit end of said whistle passage will be reduced.

9. Liquid level indicating means for use with tanks, comprising a tube forming a common vent through which gas may be vented, a first and a second passage merging in said common vent, the first of said passages formed by an extension of said tube, the second of said passages commencing at a point lower than the entrance to said first passage and including a whistle and terminating at the point of beginning of said common vent, the first of said passages directing the flow of gas therethrough past the end of the whistle passage, said extension forming the first of said passages extending a substantial distance beyond the point of junction between said common vent and said whistle passage, said extension being closed at its end and having an aperture through its top side far enough from said whistle passage so that gas entering through said aperture may have its turbulence minimized before passing said whistle passage.

FRANK P. SCULLY.
ALCIDE E. MATHEY.